(12) United States Patent
Yokoyama

(10) Patent No.: US 11,619,818 B2
(45) Date of Patent: Apr. 4, 2023

(54) LIGHT FLUX DIAMETER EXPANDING ELEMENT AND IMAGE DISPLAY DEVICE

(71) Applicant: SEIKO EPSON CORPORATION, Tokyo (JP)

(72) Inventor: Osamu Yokoyama, Shiorjiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 202 days.

(21) Appl. No.: 17/197,249

(22) Filed: Mar. 10, 2021

(65) Prior Publication Data

US 2021/0191131 A1  Jun. 24, 2021

Related U.S. Application Data

(63) Continuation of application No. 16/367,985, filed on Mar. 28, 2019, now Pat. No. 10,989,925, which is a continuation of application No. 15/433,618, filed on Feb. 15, 2017, now Pat. No. 10,281,725.

(30) Foreign Application Priority Data

Feb. 29, 2016  (JP) ................................ 2016-036787

(51) Int. Cl.
```
G02B 27/01      (2006.01)
G02B 5/18       (2006.01)
G02B 6/124      (2006.01)
G02B 26/10      (2006.01)
```
(52) U.S. Cl.
CPC ....... G02B 27/0172 (2013.01); G02B 5/1842 (2013.01); G02B 5/1866 (2013.01);
(Continued)

(58) Field of Classification Search
CPC .............. G02B 5/18; G02B 2005/1804; G02B 5/1814; G02B 5/1819; G02B 5/1823;
(Continued)

(56) References Cited

U.S. PATENT DOCUMENTS 6,992,718 B1   1/2006  Takahara
10,281,725 B2 * 5/2019 Yokoyama ............. G02B 6/124
(Continued)

FOREIGN PATENT DOCUMENTS

JP   2000-078444 A   3/2000
JP   2006-164877 A   6/2006
(Continued)

OTHER PUBLICATIONS

May 25, 2018 Office Action issued in U.S. Appl. No. 15/433,618.
(Continued)

*Primary Examiner* — Arnel C Lavarias
(74) *Attorney, Agent, or Firm* — Oliff PLC

(57) ABSTRACT

A light flux diameter expanding element includes a light guiding plate with a light input face and a light output face, and with a thickness of 0.2 mm to 0.8 mm; a diffraction grating on the input side; and a diffraction grating on the output side, and is provided so as to have the same grating period as that of the diffraction grating on the input side, in which a forming region of the diffraction grating on the input side is smaller than that of the output side, and a grating period of the diffraction grating on the input side is a period in which a small diffraction angle in diffraction angles of +1-st order diffracted light and −1-st order diffracted light, which are diffracted in the diffraction grating on the input side, in the light guiding plate becomes larger than a critical angle of the light guiding plate.

12 Claims, 11 Drawing Sheets

(52) U.S. Cl.
CPC ............ *G02B 6/124* (2013.01); *G02B 26/105* (2013.01); *G02B 2005/1804* (2013.01); *G02B 2027/011* (2013.01); *G02B 2027/013* (2013.01); *G02B 2027/0112* (2013.01); *G02B 2027/0118* (2013.01); *G02B 2027/0178* (2013.01)

(58) Field of Classification Search
CPC .... G02B 5/1866; G02B 5/1861; G02B 27/42; G02B 27/425; G02B 27/4272; G02B 27/4277; G02B 27/4288; G02B 27/44; G02B 27/01; G02B 27/0101; G02B 2027/0123; G02B 2027/0125; G02B 27/017; G02B 27/0172; G02B 2027/0178
USPC ........ 359/558, 566, 569, 570, 574, 575, 576
See application file for complete search history.

(56) References Cited

U.S. PATENT DOCUMENTS

| | | | |
|---|---|---|---|
| 10,989,925 B2* | 4/2021 | Yokoyama | G02B 27/0172 |
| 2006/0221448 A1 | 10/2006 | Nivon et al. | |
| 2007/0188837 A1 | 8/2007 | Shimizu et al. | |
| 2013/0222384 A1 | 8/2013 | Futterer | |
| 2016/0124229 A1* | 5/2016 | Yokoyama | G02B 27/4205 385/37 |
| 2016/0313556 A1 | 10/2016 | Futterer | |
| 2017/0131552 A1 | 5/2017 | Yokoyama | |

FOREIGN PATENT DOCUMENTS

| | | |
|---|---|---|
| JP | 2007-219106 A | 8/2007 |
| JP | 2007-264555 A | 10/2007 |
| JP | 2008-535032 A | 8/2008 |
| JP | 2013-003276 A | 1/2013 |
| JP | 2013-159099 A | 8/2013 |
| JP | 2014-503836 A | 2/2014 |
| JP | 2014-081481 A | 5/2014 |

OTHER PUBLICATIONS

Dec. 28, 2018 Notice of Allowance and Fee(s) Due issued in U.S. Appl. No. 15/433,618.

Dec. 16, 2020 Notice of Allowance issued in U.S. Appl. No. 16/367,985.

* cited by examiner

LIGHT FLUX DIAMETER EXPANDING ELEMENT AND IMAGE DISPLAY DEVICE

This is a Continuation of U.S. patent application Ser. No. 16/367,985 filed Mar. 28, 2019, which in turn claims the benefit of U.S. application Ser. No. 15/433,618 filed Feb. 15, 2017, which in turn claims the benefit of JP 2016-036787 filed Feb. 29, 2016. The disclosure of the prior applications is hereby incorporated by reference herein in its entirety.

BACKGROUND

1. Technical Field

The present disclosure relates to a light flux diameter expanding element and an image display device.

2. Related Art

In recent years, a mounted-type image display device such as a head mounted display has received attention. As such a head mounted display, a device which draws an image on the retina of the eyes by scanning a laser beam is known (for example, refer to JP-A-2007-264555).

In a head mounted display, image light is expanded by dividing a laser beam into a plurality of beams using a diffraction grating, it is ensured that a laser beam enters the pupils even when the eyes of an observer are moving a little, and the observer is caused to visually recognize an image.

However, it is not easy to sufficiently expand image light in the above described related art, since image light is smaller than a diameter of a pupil in a method in which a laser beam is used. Therefore, it is desirable to provide a new technology in which it is possible to cause image light to be input to a pupil, even in a case in which the image light is sufficiently smaller than the diameter of pupil, as in the method in which the laser beam is used.

SUMMARY

An advantage of some aspects of the embodiment is to provide a light flux diameter expanding element and an image display device in which it is possible to cause light to be satisfactorily input to a pupil by expanding the light.

According to an aspect of the embodiment, there is provided a light flux diameter expanding element which includes a light guiding plate with a light input face and a light output face, and with a thickness of 0.2 mm to 0.8 mm; a diffraction grating on an input side which is provided on the light input face; and a diffraction grating on an output side which is provided on the light output face, and is provided so as to have the same grating period as that of the diffraction grating on the input side, in which the diffraction grating on the input side is smaller than the diffraction grating on the output side, and a grating period of the diffraction grating on the input side is a period in which a small diffraction angle in diffraction angles of +1-st order diffracted light and −1-st order diffracted light, which are diffracted in the diffraction grating on the input side, in the light guiding plate becomes larger than a critical angle of the light guiding plate.

According to the light flux diameter expanding element in the aspect, it is possible to increase one laser beam input to an input face to a plurality of laser beams, in a state in which an input angle of the laser beam with respect to the input face is maintained. Since a thickness of the light guiding plate is set to 0.2 mm to 0.8 mm, it is possible to preferably adjust intervals of the plurality of laser beams to intervals (2 mm or less) smaller than a diameter of the pupils of the eyes.

Accordingly, it is possible to cause at least one light beam to be input to pupils of eyes, even when the eyes of an observer are moving.

In the light flux diameter expanding element according to the aspect, when a shortest wavelength in wavelength bands of input light which is input to the light input face is set to $\lambda_{min}$, an absolute value of a maximum angle of an input angle of the input light with respect to the light input face is set to $|\theta_{max}|$, and a grating period of the light input face is set to P, it is preferable that a grating period of the light input face satisfy $P \leq \lambda_{min}/(\sin|\theta_{max}|+1)$.

According to the configuration, it is possible to cause light which is input to the diffraction grating on the input side to be propagated inside the light guiding plate using total reflection. In this manner, it is possible to preferably expand a diameter of a light flux which is output from the light output face.

In the light flux diameter expanding element according to the aspect, it is preferable that a height of a grating of the diffraction grating on the output side is lower than a height of a grating of the diffraction grating on the input side.

According to the configuration, a diffraction efficiency of the diffraction grating on the output side is set to be lower than that of the diffraction grating on the input side. Accordingly, it is possible to cause light which is propagated inside the light guiding plate to be output from an output face in a plurality of places, using the diffraction grating on the output side. In this manner, it is possible to preferably obtain a function of expanding a light flux diameter.

According to another aspect of the embodiment, there is provided an image display device which includes an image light generation unit which outputs image light; and an image light expanding element which is configured of the light flux diameter expanding element according to the above described aspect.

According to the image display device in the aspect, since the light flux diameter expanding element is provided, it is possible to preferably cause an observer to visually recognize image light, even in a case in which pupils of the observer are moving.

In the image display device according to the aspect, it is preferable that the image light include light with different wavelength bands, a plurality of the image light expanding elements be provided, and grating periods of each of the diffraction gratings on input side of the plurality of image light expanding elements be different from each other.

According to the configuration, it is possible to set a diffraction angle of light in different wavelength bands in the respective light guiding plates to be the same.

In addition, it is preferable that each of the light guiding plates of the plurality of image light expanding elements be provided so as to have the same thickness as each of the others.

By doing so, it is possible to cause light to be output from the same position, regardless of wavelength bands of the light.

In the image display device according to the aspect, it is preferable that a grating period of the diffraction grating on the input side of each of the plurality of image light expanding elements become larger while being separated from the image light generation unit.

According to the configuration, it is possible to minimize occurrences of unnecessary diffracted light.

In the image display device according to the aspect, it is preferable that the plurality of image light expanding elements include a first image light expanding element, a second image light expanding element, and a third image light expanding element, a grating period of the diffraction grating on the input side of each of the first image light expanding element, the second image light expanding element, and the third image light expanding element be a period in which a diffraction angle of diffracted light which is diffracted in each of the diffraction gratings on input side become the same angle, and the image light include light in a first wavelength band corresponding to the first image light expanding element, light in a second wavelength band corresponding to the second image light expanding element, and light in a third wavelength band corresponding to the third image light expanding element.

According to the configuration, it is possible to display a color image.

In the image display device according to the aspect, it is preferable that the image display device further include an ocular optical system to which light output from the plurality of image light expanding elements is input, and the ocular optical system have light-transmitting properties.

According to the configuration, it is possible to visually recognize outside light (see-through light), along with image light.

BRIEF DESCRIPTION OF THE DRAWINGS

The embodiment will be described with reference to the accompanying drawings, wherein like numbers reference like elements.

DESCRIPTION OF EXEMPLARY EMBODIMENTS

Hereinafter, embodiments will be described in detail with reference to drawings. There is a case in which characteristic portions of the drawings used in the descriptions below are illustrated by being enlarged for convenience, in order to make characteristics be easily understood, and a ratio of dimension of each constituent element, or the like, is not always the same as the actual dimension.

First Embodiment

An image display device according to the embodiment is an example of a head mounted display which is used by being mounted on head of a user.

In the following descriptions, the head mounted display is briefly described as an HMD.

Figure 1:
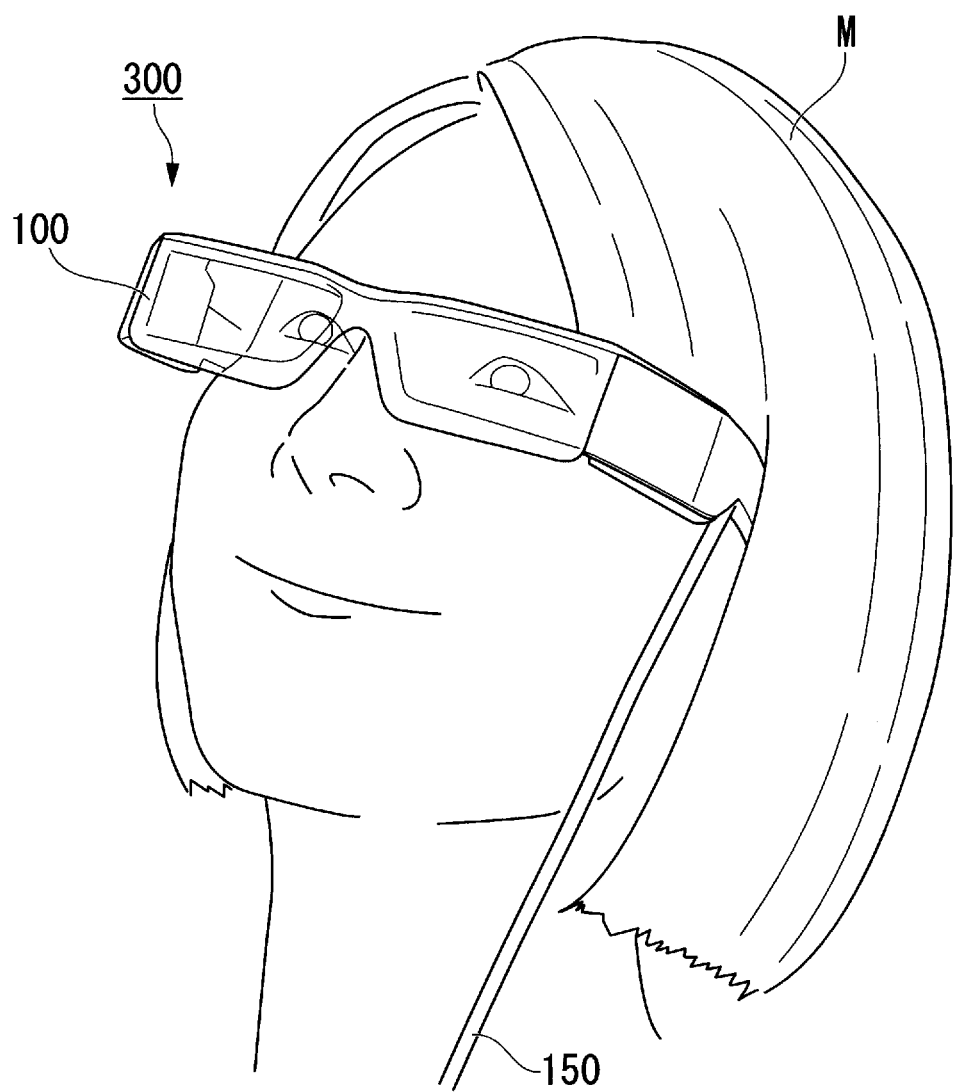
FIG. 1 is a diagram which illustrates a use form of an HMD according to a first embodiment.

FIG. 1 is a diagram which illustrates a state in which a user wears the HMD according to the embodiment.

Figure 2:
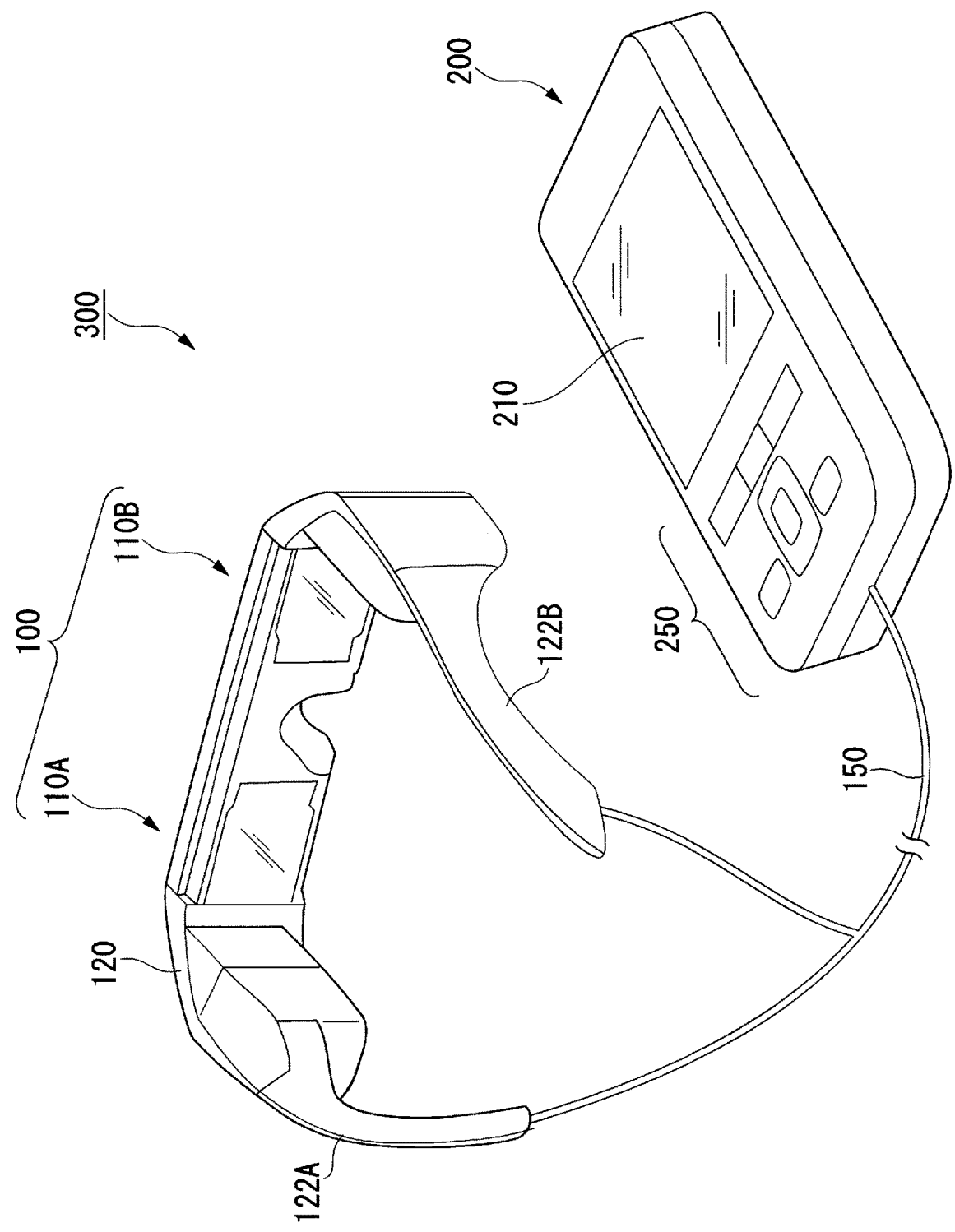
FIG. 2 is a perspective view of the HMD according to the first embodiment.

FIG. 2 is a perspective view of the HMD according to the embodiment.

As illustrated in FIG. 1, an HMD 300 according to the embodiment is a display which is used when a user wears the display with a sense of wearing glasses. The HMD 300 according to the embodiment is a see-through-type (transmission type) HMD. According to the HMD 300 in the embodiment, a user is able to visually recognize an image generated by an image display unit, and it is also possible to visually recognize an outside image such as outside scenery of the HMD 300.

As illustrated in FIG. 2, the HMD 300 is provided with a display device 100 which is formed in a shape similar to glasses, and a control unit (controller) 200 with a size which a user can hold in hands. The display device 100 and the control unit 200 are communicably connected in a wired or wireless manner. According to the embodiment, each of an image display unit for left eye 110A and an image display unit for right eye 110B which configure the display device 100, and the control unit 200 are communicably connected in a wired manner through a cable 150, and perform a communication of an image signal or a control signal.

The display device 100 is provided with a main frame (device main body) 120, and the image display unit for left eye 110A and the image display unit for right eye 110B. The control unit 200 is provided with a display unit 210, and an operation button unit 250. The display unit 210 displays, for example, various information, an instruction, or the like, which is provided to a user. The main frame 120 is provided with a pair of temple portions 122A and 122B which is used when a user hooks thereof around ears. The main frame 120 is a member for supporting the image display unit for left eye 110A and the image display unit for right eye 110B.

The image display unit for right eye 110B and the image display unit for left eye 110A have the same configuration, and each constituent element in both of the image display units is bisymmetrically disposed. For this reason, hereinafter, the image display unit for right eye 110B will be described in detail, as the image display unit 110, simply, and descriptions of the image display unit for left eye 110A will be omitted.

Figure 3:
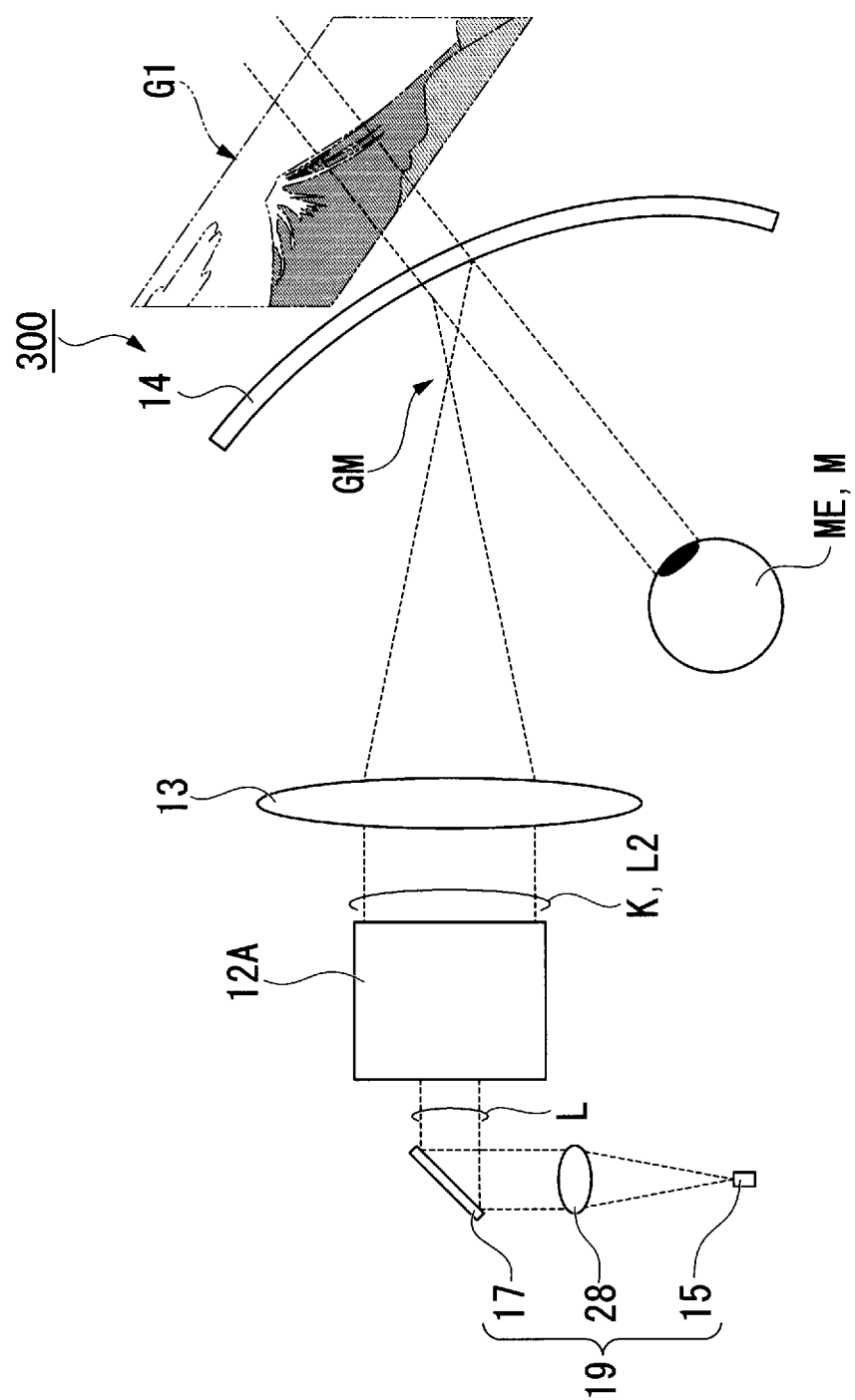
FIG. 3 is a diagram which illustrates a configuration of an image display unit.

FIG. 3 is a diagram which illustrates a configuration of the image display unit 110.

As illustrated in FIG. 3, the image display unit 110 is provided with an image light generation unit 19, an image light expanding unit 20, a condensing optical system 13, and an ocular optical system 14. The image light generation unit 19 outputs light including image information. The image light expanding unit 20 expands a beam diameter of light which is output from a light scanning unit 17 which will be described later.

The image light generation unit 19 is provided with a light source unit 15, a collimator lens 28, and the light scanning unit 17. The light source unit 15 outputs light generated by a semiconductor laser in the inside. The light source unit 15 is provided with a solid light source which includes at least one of, for example, a semiconductor laser which outputs red light, a semiconductor laser which outputs green light, and a semiconductor laser which outputs blue light.

In a case in which the light source unit 15 is provided with a plurality of the solid light sources (not illustrated) which include the semiconductor laser outputting red light, the semiconductor laser outputting green light, and the semiconductor laser outputting blue light, each color light output from each semiconductor laser is modulated according to an image signal, the modulated each color light is composited, and is output from the light source unit 15 as image light.

The collimator lens 28 collimates the light input from the light source unit 15.

The light scanning unit 17 scans light which is reflected on a mirror 16. The light scanning unit 17 is provided with, for example, a MEMS mirror (not illustrated). The light scanning unit 17 changes a posture of the MEMS mirror according to a modulation operation of the light source unit 15, and two-dimensionally scans light. In this manner, the light scanning unit 17 outputs image light including image information.

In the HMD 300 according to the embodiment, a wide view angle is executed by generating image light using the light scanning unit 17 which includes the MEMS mirror. The light scanning unit 17 according to the embodiment adopts, for example, a MEMS mirror of which a diameter is 1 mm, and an oscillation angle is a half view angle, and is 10°.

The image light expanding unit 20 is a unit for duplicating a light beam of which a view angle (angle of input light beam) is maintained over a wide range so that a light beam for viewing an image definitely enters eyes (pupils), even when eyes of an observer move vertically and horizontally.

Figure 4:
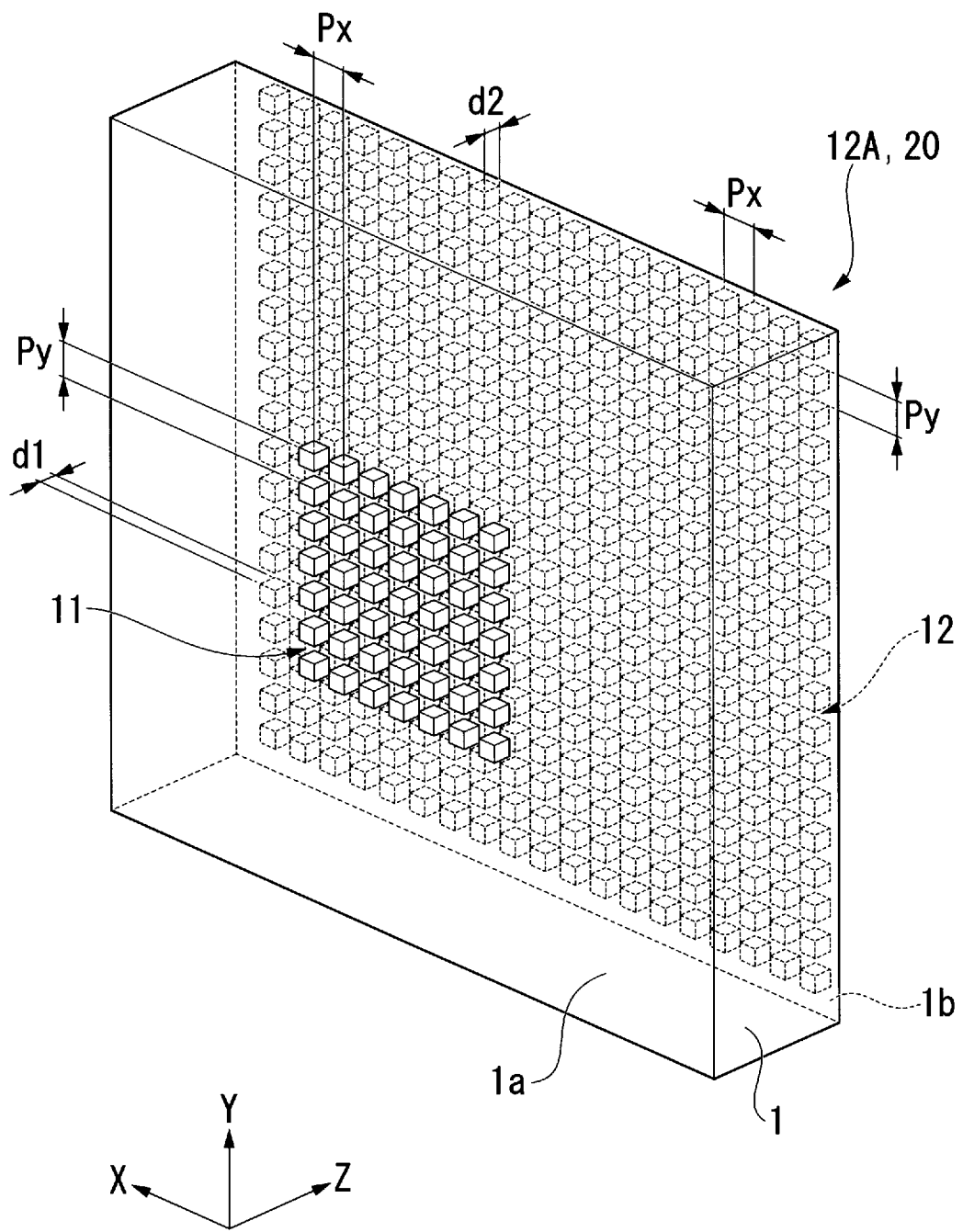
FIG. 4 is a perspective view which illustrates a configuration of an image light expanding unit.

FIG. 4 is a perspective view which illustrates a configuration of the image light expanding unit 20 according to the embodiment. In the descriptions, it is assumed that monochromatic light (image light) is output from the light source unit 15 of the image light generation unit 19.

As illustrated in FIG. 4, the image light expanding unit 20 is configured of one image light expanding element 12A. The image light expanding element 12A includes a light guiding plate 1, a diffraction grating on the input side 11, and a diffraction grating on the output side 12.

The light guiding plate 1 is configured of glass, or a parallel flat plate which is formed of an optical resin, or the like. In the embodiment, the light guiding plate 1 is configured of a glass substrate with a refractive index of 1.52.

The light guiding plate 1 includes a light input face 1a on one face thereof, and the diffraction grating on the input side 11 is provided on the light input face 1a. In addition, the light guiding plate 1 includes a light output face 1b on the other face, and the diffraction grating on the output side 12 is provided on the light output face 1b.

In the following descriptions, the descriptions will be appropriately made using XYZ coordinates. In this case, an X direction corresponds to one direction of a face parallel to the light input face 1a and the light output face 1b of the light guiding plate 1, a Y direction corresponds to a direction orthogonal to the X direction in a plane parallel to the light input face 1a and the light output face 1b, and a Z direction corresponds to a direction orthogonal to the X direction and the Y direction, and a thickness direction of the light guiding plate 1.

The diffraction grating on the input side 11 and the diffraction grating on the output side 12 are surface relief-type diffraction gratings, and are set so that grating directions and grating periods are the same in the diffraction grating on the input side 11 and the diffraction grating on the output side 12. In the diffraction grating on the input side 11, a plurality of gratings 11a which extend in the X direction are formed at even intervals in the Y direction. In the diffraction grating on the output side 12, a plurality of gratings 12a which extend in the X direction are formed at even intervals in the Y direction.

According to the embodiment, grating periods Px of the diffraction grating on the input side 11 and the diffraction grating on the output side 12 in the X direction are the same, and grating periods Py thereof in the Y direction are the same, as well. The grating periods Px and Py may be the same, or may be different. Specifically, according to the embodiment, the grating period Px and the grating period Py in the diffraction grating on the input side 11 and the diffraction grating on the output side 12 are set to 0.447 µm, respectively. Hereinafter, there also is a case in which the grating period Px and the grating period Py are collectively referred to as a grating period P.

Light input to the image light expanding element 12A is diffracted by the diffraction grating on the input side 11, and is introduced into the light guiding plate 1. According to the embodiment, a diffraction angle of the diffraction grating on the input side 11 is set so that light is propagated inside the light guiding plate 1 using total reflection. A diffraction angle in the diffraction grating on the input side 11 is determined according to a diffraction period of the different grating.

According to the embodiment, the diffraction grating on the input side 11 and the diffraction grating on the output side 12 configure a grating pattern in which protrusion-shaped bodies are two-dimensionally disposed in a plane which is parallel to an XY plane. In FIG. 4, d1 denotes a height of the protrusion-shaped body of the diffraction grating on the input side 11 (hereinafter, referred to as height of grating) in the Z direction, and d2 denotes a height of grating of the diffraction grating on the output side 12.

Subsequently, a function of expanding pupils in the image light expanding element 12A will be described. According to the embodiment, light with a predetermined input angle distribution (range from −10° to +10°) is input to the light input face 1a of the image light expanding element 12A using the light scanning unit 17.

Figure 5:
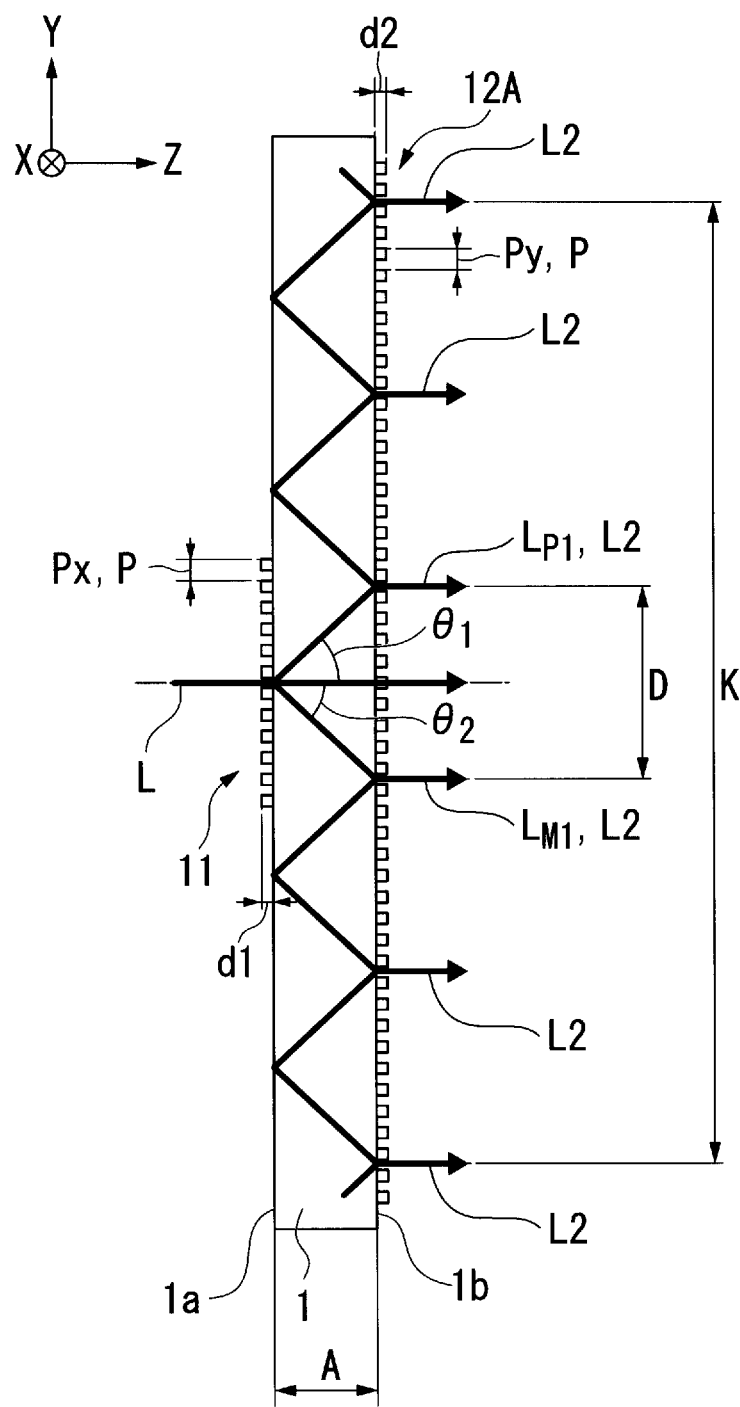
FIG. 5 is an explanatory diagram in a case in which light with an input angle 0° is input to an image light expanding element including a light guiding plate with a thickness of 0.8 mm.
Figure 6:
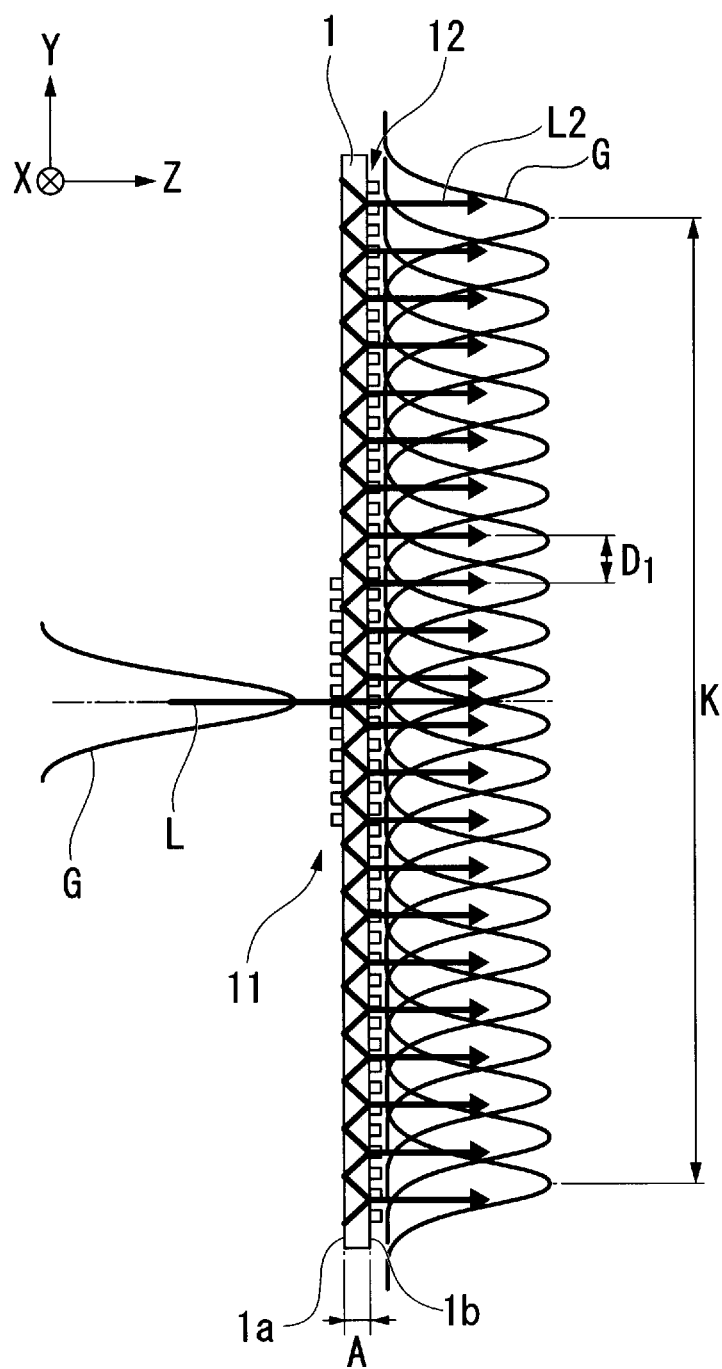
FIG. 6 is an explanatory diagram in a case in which light with an input angle 0° is input to the image light expanding element including a light guiding plate with a thickness of 0.2 mm.

FIGS. 5 and 6 are explanatory diagrams in a case in which light with an input angle of 0° is input to the image light expanding element 12A. In addition, FIG. 5 is an explanatory diagram in a case in which a thickness of the light guiding plate 1 is 0.8 mm, and FIG. 6 is an explanatory diagram in a case in which a thickness of the light guiding plate 1 is 0.2 mm.

Figure 7:
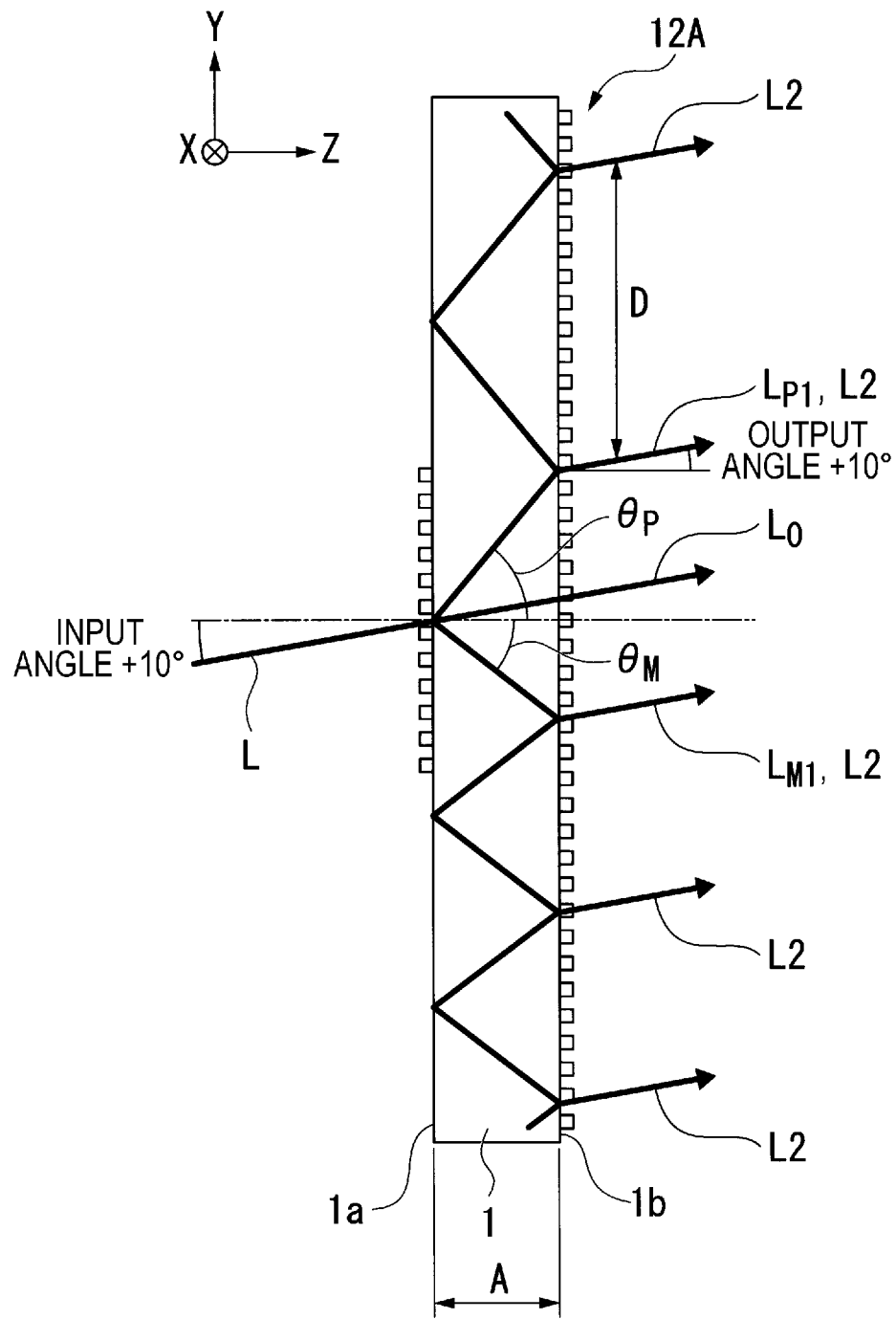
FIG. 7 is an explanatory diagram in a case in which light with an input angle +10° is input to the image light expanding element.
Figure 8:
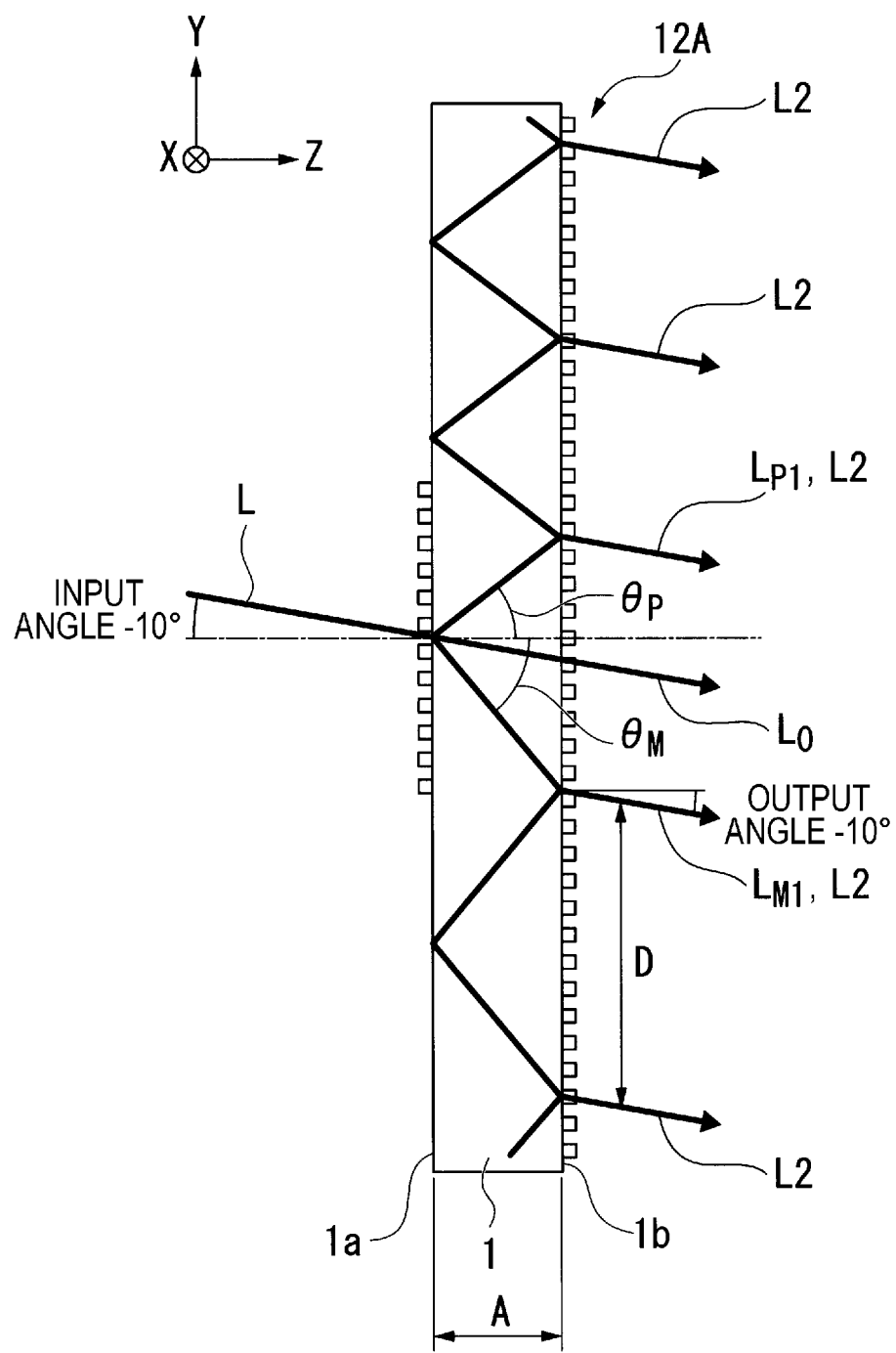
FIG. 8 is an explanatory diagram in a case in which light with an input angle −10° is input to the image light expanding element.

FIG. 7 is an explanatory diagram in a case in which light with an input angle of +10° is input to the image light expanding element 12A, and FIG. 8 is an explanatory diagram in a case in which light with an input angle of −10° is input to the image light expanding element 12A. In addition, in FIGS. 5 to 8, it is assumed that light L formed of laser light of which a wavelength is 0.525 µm is input to the image light expanding element 12A.

FIGS. 5 to 8 illustrate a section parallel to a YZ plane, and in which propagation of light in the Y direction is explained; however, it is assumed that propagation of light similarly occurs also in the X direction. That is, it is assumed that light expanded by the image light expanding element 12A is two-dimensionally expanded in the X direction and the Y direction.

According to the embodiment, in diffracted light, +1-st order diffracted light and −1-st order diffracted light of which diffraction efficiency can be set to be high are focused. In addition, 0-th order diffracted light is also generated; however, it is preferable to set 0-th order diffraction efficiency to be low, since the 0-th order diffracted light does not contribute to expanding of a light flux diameter.

As illustrated in FIG. 5, light L forms plurality of diffracted light (0-th order diffracted light $L_0$, +1-st order diffracted light $L_{P1}$, and −1-st order diffracted light $L_{M1}$) in the inside of the light guiding plate 1, by being diffracted by the diffraction grating on the input side 11. Specifically, the 0-th order diffracted light $L_0$ has a diffraction angle of 0°, and is introduced into the light guiding plate 1. The +1-st order diffracted light $L_{P1}$ and the −1-st order diffracted light $L_{M1}$ have equal diffraction angles of $\theta_1$ and $\theta_2$ to each other, and the angle is 50.6°.

Light which is propagated inside the light guiding plate 1, and reaches the diffraction grating on the output side 12 is diffracted in the diffraction grating on the output side 12, and a part thereof (transmitted diffracted light) is taken to the outside from the light guiding plate 1.

According to the embodiment, the grating periods P of the diffraction grating on the input side 11 and the diffraction grating on the output side 12 are set to be the same. For this reason, an output angle of light when being output from the diffraction grating on the output side 12 is also set to an angle 0° which is the same as the input angle, since the diffraction grating on the input side 11 and the diffraction grating on the output side 12 have the same diffracting force.

The +1-st order diffracted light $L_{P1}$ and the −1-st order diffracted light $L_{M1}$ which are reflected in the diffraction grating on the output side 12 are reflected at the same angle as the angle input to the diffraction grating on the output side 12, that is, at the angle of 50.6° which is the same as the diffraction angle, are propagated inside the light guiding plate 1, and reach the light input face 1a.

Here, when the diffraction grating on the input side 11 is disposed at a position at which the reflected diffracted light using the diffraction grating on the output side 12 reaches, diffracted light occurs, and light is output to the outside from the light guiding plate 1, and as a result, an intensity of light which is propagated inside the light guiding plate 1 decreases.

According to the embodiment, the diffraction grating on the input side 11 is provided at a portion (center portion) of the light input face 1a of the light guiding plate 1, and the diffraction grating on the output side 12 is provided on the entire face of the light output face 1b of the light guiding plate 1. That is, the diffraction grating on the input side 11 and the diffraction grating on the output side 12 are formed in regions which overlap in the thickness direction (Z direction) of the light guiding plate 1, and a size of a forming region of the diffraction grating on the output side 12 is larger than that of a forming region of the diffraction grating on the input side 11.

According to the embodiment, as described above, since the diffraction grating on the input side 11 is not located at a position of the light input face 1a at which the reflected diffracted light using the diffraction grating on the output side 12 reaches, it is possible to preferably cause the reflected diffracted light using the diffraction grating on the output side 12 to be propagated inside the light guiding plate 1, by causing the diffracted light to be totally reflected on the light input face 1a.

According to the embodiment, since the diffraction angles (50.6°) of the +1-st order diffracted light $L_{P1}$ and the −1-st order diffracted light $L_{M1}$ become larger than a critical angle (41.4°) which is determined by the refractive index (1.52) of the light guiding plate 1, the +1-st order diffracted light $L_{P1}$ and the −1-st order diffracted light $L_{M1}$ are caused to be propagated inside the light guiding plate 1 in the Y direction, using total reflection.

The image light expanding element 12A duplicates the light L by causing the +1-st order diffracted light $L_{P1}$ and the −1-st order diffracted light $L_{M1}$ which are propagated inside the light guiding plate 1 using total reflection to be output a plurality of times, using the diffraction grating on the output side 12, and obtains an expanded light flux K which is formed of plurality of output light L2.

Here, when primary diffraction efficiency in transmitting of the diffraction grating on the output side 12 is high, most of intensity of light at a time of a first input of the +1-st order diffracted light $L_{P1}$ and the −1-st order diffracted light $L_{M1}$ to the diffraction grating on the output side 12 is output to the outside of the light guiding plate 1, and an intensity of light which remains in the light guiding plate 1 decreases. Due to this, an intensity of light which is output to the outside of the light guiding plate 1 at a time of a second input and thereafter of the +1-st order diffracted light $L_{P1}$ and the −1-st order diffracted light $L_{M1}$, which are propagated inside the light guiding plate 1, to the diffraction grating on the output side 12 remarkably decreases.

For this reason, diffraction efficiency of the diffraction grating on the output side 12 is set to be lower than diffraction efficiency of the diffraction grating on the input side 11. That is, the height of grating d2 of the diffraction grating on the output side 12 is set to be lower than the height of grating d1 of the diffraction grating on the input side 11. In addition, the diffraction efficiency of the diffraction grating on the output side 12 is set according to the number of times of taking light to the outside of the light guiding plate 1 (the number of output light L2) from the diffraction grating on the output side 12.

The height of grating d1 of the diffraction grating on the input side 11 is set to a height in which primary diffraction efficiency becomes high with respect to the light L which is vertically input (wavelength 0.525 μm). For example, in a case in which a refractive index of the diffraction grating on the input side 11 is 1.65, the height of grating d1 becomes approximately 0.25 μm, and the height of grating d2 is set to be lower than 0.25 μm.

As described above, according to the embodiment, duplicating of a light beam is performed by causing the +1-st order diffracted light $L_{P1}$ and the −1-st order diffracted light $L_{M1}$ to be propagated inside the light guiding plate 1, by providing the diffraction grating on the input side 11 at a center of the light input face 1a. In contrast to this, in a case in which the diffraction grating on the input side 11 is provided at an end portion of the light input face 1a, in order to cause the +1-st order diffracted light $L_{P1}$ or the −1-st order diffracted light $L_{M1}$ to be output from an end portion of the light guiding plate 1, attenuation of light increases, and an intensity of an output light beam at the end portion of the light guiding plate 1 remarkably decreases, since the number of total reflection increases.

According to the embodiment, since a distance from an input position of the light L to the end of the light guiding plate 1 is a half of the entire light guiding plate 1, it is possible to suppress a decrease in intensity of output light at the end portion of the light guiding plate 1.

Meanwhile, it is said that a diameter of pupils of eyes of an observer is approximately 2 mm, in general.

For this reason, in order to set so that the observer can visually recognize an image, when eyes of the observer move vertically and horizontally, it is necessary to set intervals of the plurality of output light L2 which configure the expanded light flux K to approximately the diameter of pupils (2 mm). That is, the image light expanding element 12A according to the embodiment is designed so that the intervals of the plurality of output light L2 are set to be approximately 2 mm.

For a unit for making the interval of the output light L2 which is taken to the outside from the image light expanding element 12A small, the following method is taken into consideration.

As a first method, a method of setting the grating period P in the diffraction grating on the input side 11 to be large, that is, a method of setting a diffraction angle to be small is taken into consideration. However, in this case, propagation of light in the inside of the light guiding plate 1 using total reflection is not possible, since the diffraction angle becomes smaller than the critical angle, and there is a concern that a function of expanding pupils (function of duplicating output light beam) may not be sufficiently obtained.

As a second method, a method of using a material with a high refractive index as the light guiding plate 1 is taken into consideration. However, in this case, since glass with a refractive index higher than general optical glass (refractive index of 1.52), which is used in the embodiment is expensive, a manufacturing cost rises.

The inventor paid attention to the fact that intervals of the output light L2 are regulated by the grating period P and the thickness of the light guiding plate 1, and found a range of the thickness of the light guiding plate 1 in which it is possible to set an interval D of the output light L2 to 2 mm or less, in a case of setting to the grating period P in which a diffraction angle which satisfies conditions of total reflection in the inside of the light guiding plate 1 is obtained.

Specifically, the inventor found that a thickness A of the light guiding plate 1 is set to the range of 0.2 mm to 0.8 mm.

It is possible to generate the expanded light flux K of which a light flux diameter is 10 mm in which the plurality of output light beams L2 are disposed at intervals of 2 mm, as illustrated in FIG. 5, by taking out the output light L2 three times in the +1-st order direction and the −1-st order direction, respectively, in the image light expanding element 12A in which the grating period P is set to 0.447 μm, and the thickness A of the light guiding plate 1 is set to 0.8 mm.

In this case, it is possible to preferably cause an observer to visually recognize an image, since at least one beam of the output light L2 is input to pupils, even when eyes of the observer move in a range of 10 mm in which the expanded light flux K is present.

In addition, it is possible to generate the expanded light flux K of which the light flux diameter is 10 mm, in which the plurality of output light beams L2 are disposed at intervals $D_1$ of 0.5 mm, as illustrated in FIG. 6, by taking out the output light L2 eleven times, respectively, in the +1-st order direction and the −1-st order direction in the image light expanding element 12A in which the grating period P is set to 0.447 μm, and the thickness A of the light guiding plate 1 is set to 0.2 mm.

Here, the light L and each of the output light beams L2 include Gauss distribution G with a diameter of approximately 1 mm. For this reason, when intervals $D_1$ of the output light beams L2 which are adjacent to each other becomes 0.5 mm, each of the output light beams L2 enters a state of being overlapped, spatially, as illustrated in FIG. 6.

In this case, it is possible to preferably cause an observer to visually recognize an image, since at least four beams of the output light L2 are input to pupils, even when eyes of the observer move in a range of 10 mm in which the expanded light flux K is present.

As illustrated in FIG. 6, since each output light L2 spatially overlaps, it is possible to cause light with uniform illuminance distribution to be input to eyes, even when eyes of the observer move in a range of the expanded light flux K. Accordingly, it is possible for the observer to visually recognize an image with a good quality with a little brightness unevenness.

Subsequently, a case in which the thickness A of the light guiding plate 1 is deviated from the range of 0.2 mm to 0.8 mm will be described. For example, in a case in which the thickness A of the light guiding plate 1 is larger than 0.8 mm, the interval of the output light L2 becomes larger than 2 mm, and the function of expanding pupils becomes insufficient.

In a case in which the thickness A of the light guiding plate 1 is smaller than 0.2 mm, the number of times of reflection in the output light L2 until being output from the end portion of the light guiding plate 1 increases, and an output intensity of the output light L2 at the end portion of the light guiding plate 1 remarkably decreases. Accordingly, unevenness occurs in the intensity of the output light L2, at a center portion and the end portion of the light guiding plate 1, and there is a concern that luminance unevenness may occur in a visually recognized image when eyes of an observer move. When the thickness becomes smaller than 0.2 mm, the light guiding plate 1 is easily broken, and handling thereof becomes difficult.

According to the image light expanding element 12A in the embodiment, it is possible to preferably cause an image to be visually recognized, even when the eyes of the observer move by using the light guiding plate 1 with the thickness of 0.2 mm to 0.8 mm.

Subsequently, a case in which the light L is obliquely input to the image light expanding element 12A (case in which input angle is ±10) will be described while referring to FIGS. 7 and 8. In addition, in FIGS. 7 and 8, a sign of an angle in a counterclockwise direction with respect to the light input face 1a or the light output face 1b is set to a positive sign (+), and an angle in a clockwise direction is set to a negative sign (−).

As illustrated in FIG. 7, in a case in which an input angle of the light L is 10°, diffraction angles of the +1-st order diffracted light $L_{P1}$ and the −1-st order diffracted light $L_{M1}$ using the diffraction grating on the input side 11 are different. Specifically, a +1-st order diffraction angle $\theta_P$ becomes +62.4°, and a −1-st order diffraction angle $\theta_M$ becomes −41.4°. In addition, output angles of the +1-st order diffraction angle $\theta_P$ and the −1-st order diffraction angle $\theta_M$ from the light guiding plate 1 are +10° which are the same as the input angle, that is, the light beams are output in the same direction.

A diffraction angle of the −1-st order diffracted light $L_{M1}$ becomes small in the light L which is input at an input angle of +10°. Accordingly, when an absolute value of the diffraction angle $\theta_M$ of the −1-st order diffracted light $L_{M1}$ becomes larger than the critical angle 41.4°, the diffraction angle $\theta_P$ of the +1-st order diffracted light $L_{P1}$ essentially becomes larger than the critical angle.

According to the embodiment, since the absolute value of the diffraction angle $\theta_M$ is equal to the critical angle, the +1-st order diffracted light $L_{P1}$ and the −1-st order diffracted light $L_{M1}$ can be propagated inside the light guiding plate 1 using total reflection. In addition, according to the embodiment, when the input angle becomes larger than 10°, the diffraction angle $\theta_M$ of the −1-st order diffracted light $L_{M1}$ becomes smaller than the critical angle, and the −1-st order diffracted light $L_{M1}$ is incapable of being propagated inside the light guiding plate 1 using total reflection.

As illustrated in FIG. 8, in a case in which the input angle of the light L is −10°, it enters a state in which a relationship of the input angle 10° in FIG. 7 is vertically inversed. That is, the +1-st order diffraction angle $\theta_P$ becomes +41.4°, and the −1 diffraction angle $\theta_M$ becomes −62.4°. In addition, output angles of the +1-st order diffraction angle $\theta_P$ and the −1-st order diffraction angle $\theta_M$ from the light guiding plate 1 are −10° which are the same as the input angle, that is, the light beams are output in the same direction.

Since the diffraction angle $\theta_P$ of the +1-st order diffraction light $L_{P1}$ of which the diffraction angle is small in the light L which is input at an input angle of −10° is equal to the critical angle, the +1-st order diffracted light $L_{P1}$ and the −1-st order diffracted light $L_{M1}$ can be propagated inside the light guiding plate 1 using total reflection.

Here, conditions under which the primary diffracted light can be propagated inside the light guiding plate 1 using total reflection will be described by using an expression. First, a wavelength of the light L is set to $\lambda$, an absolute value of the maximum angle of the input angle is set to $|\theta_{max}|$, the refractive index of the light guiding plate 1 is set to n, and the grating period P in which a diffraction angle of the primary diffracted light in the light guiding plate 1 matches the critical angle is expressed by the following expression.

$$P=\lambda/[\sin|\theta_{max}|+1] \quad \text{Expression (1)}$$

In a case in which the grating period P is set to be constant, the diffraction angle depends on a wavelength of the light L which is input, and the shorter the wavelength, the smaller the diffraction angle. Accordingly, in a case in which the light L which is input has wavelength distribution, when an absolute value of the diffraction angle of the primary diffracted light with respect to a shortest wavelength $\lambda_{min}$ in the wavelength bands of the light L is larger than the critical angle, it is possible to cause the primary diffracted light to be propagated inside the light guiding plate 1 using total reflection with respect to the light L in the entire wavelength band. The grating period P which satisfies the condition can be expressed, using the following expression. In addition, in the grating period P in the following expression, a large period is set to a target, in a case in which periods of the grating periods Px and Py are different.

$$P=\lambda_{min}/[\sin|\theta_{max}|+1] \quad \text{Expression (2)}$$

According to the image light expanding element 12A in the embodiment, it is possible to cause an image to be visually recognized, preferably, even when eyes of an observer move, by using the light guiding plate 1 with the thickness of 0.2 mm to 0.8 mm, even in a case in which the light L is obliquely input to the image light expanding element 12A.

Returning to FIG. 3, the condensing optical system 13 is configured of a plurality of lenses (not illustrated), and has a positive power as a whole. The expanded light flux K which is output from the image light expanding element 12A is not one thin beam, and is spatially spread. For this reason, when being directly input to the ocular optical system 14, aberration or distortion of image occurs due to the ocular optical system 14. In contrast to this, according to the embodiment, light output from the image light expanding element 12A is condensed by the condensing optical system 13 which has the positive power as a whole, and an intermediate image GM is formed right before the ocular optical system 14. In this manner, it is possible to reduce an occurrence of the aberration or the distortion of image.

The ocular optical system 14 is configured of a power mirror (concave mirror) which has a positive power in a plane including at least the main frame 120 (refer to FIG. 2) and eyes ME of an observer M, or a holographic optical element. The ocular optical system 14 forms an exit pupil in the vicinity of pupils of the eyes ME of the observer M by collimating light which forms the intermediate image GM, and transmits part of outside light. For this reason, the observer M can visually recognize a virtual image G1 in the distance, along with the outside light.

As described above, according to the image light expanding element 12A in the embodiment, it is possible to cause the expanded light flux K, in which a plurality of output light beams L2 are disposed with a size of approximately 2 mm which is smaller than a size of a pupil, to be input to the eyes ME of the observer M, as image light. Accordingly, even in a case in which the eyes ME of the observer M are moved, it is possible to cause the eyes ME to visually recognize the image light, preferably. In addition, since the primary diffracted light is propagated inside the light guiding plate 1 in a state of total reflection, and is output from the diffraction grating on the output side 12, use efficiency of light becomes high.

Accordingly, the HMD 300 which is provided with the image light expanding element 12A becomes a display which is excellent in image visibility, and has high reliability.

Second Embodiment

Subsequently, a second embodiment will be described. A configuration of an image light expanding element in the embodiment is different from that in the above described embodiment. Specifically, in the above described embodiment, the case in which monochromatic light is input from the light source unit 15 of the image light generation unit 19 has been described; however, in the embodiment, a case in which light beams of three colors are input from the light source unit 15 of the image light generation unit 19 will be described.

Figure 9:
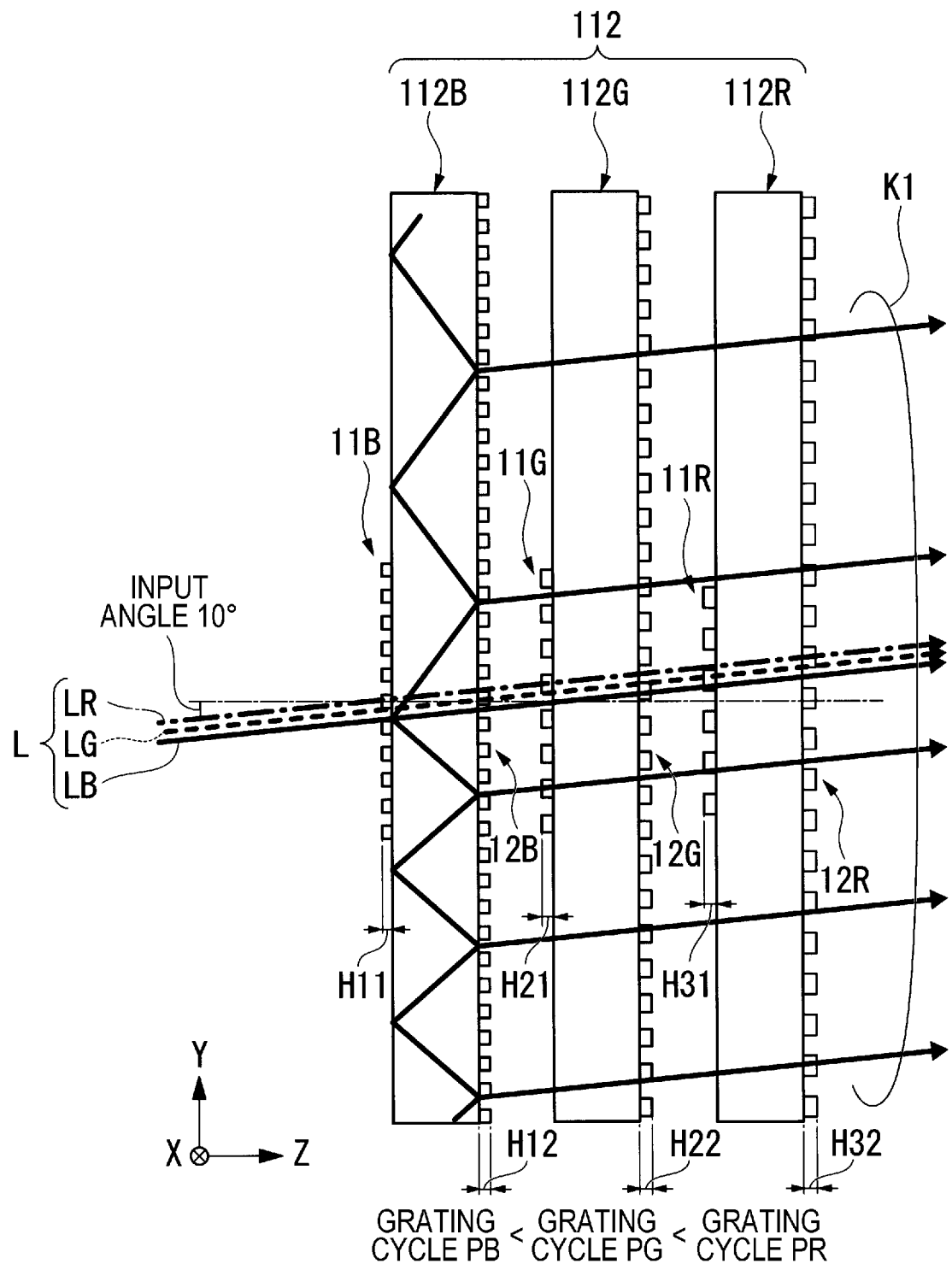
FIG. 9 is a diagram which illustrates a sectional configuration of an image light expanding unit according to a second embodiment.
Figure 10:
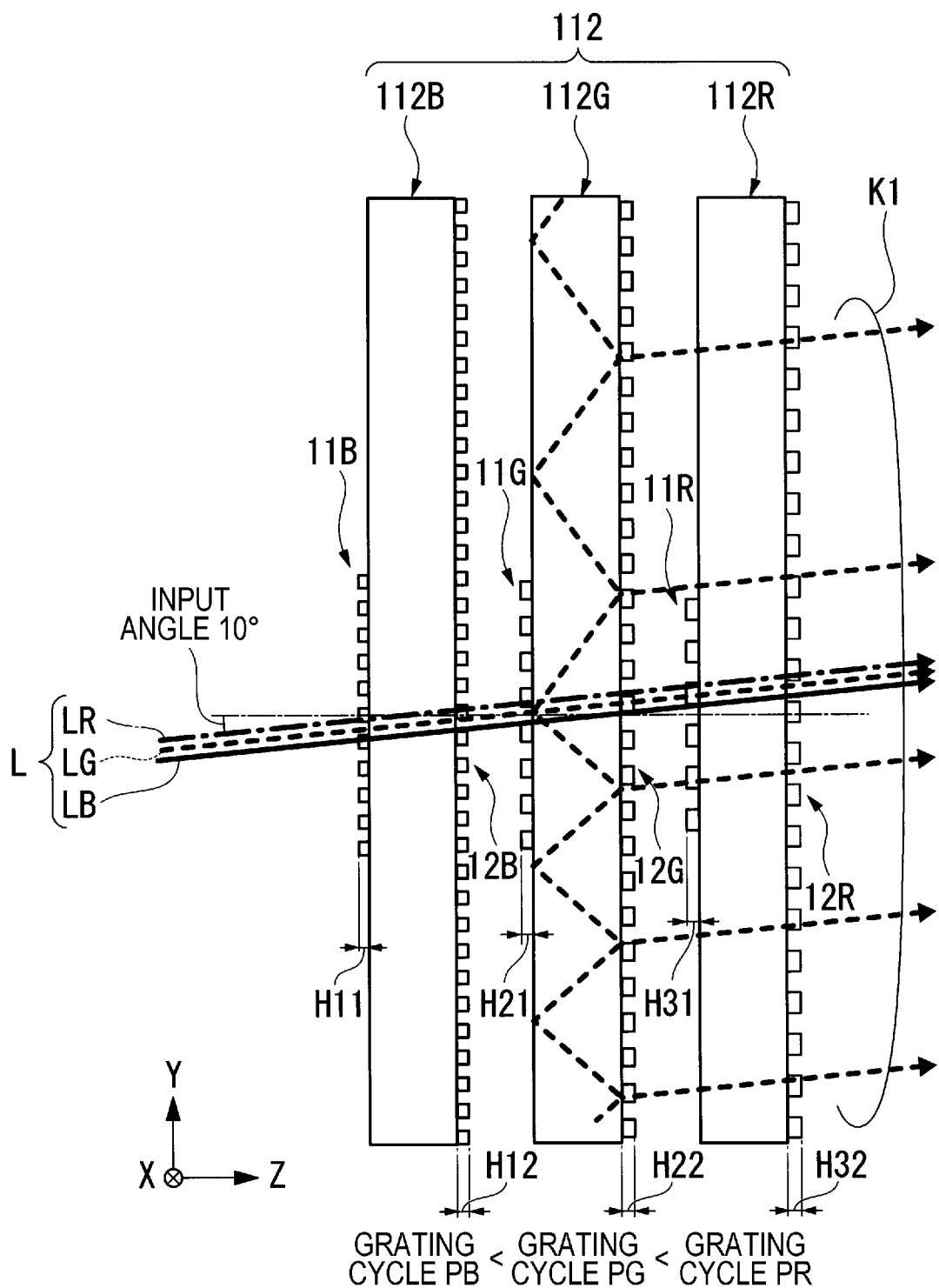
FIG. 10 is a diagram which illustrates a sectional configuration of the image light expanding unit according to the second embodiment.
Figure 11:
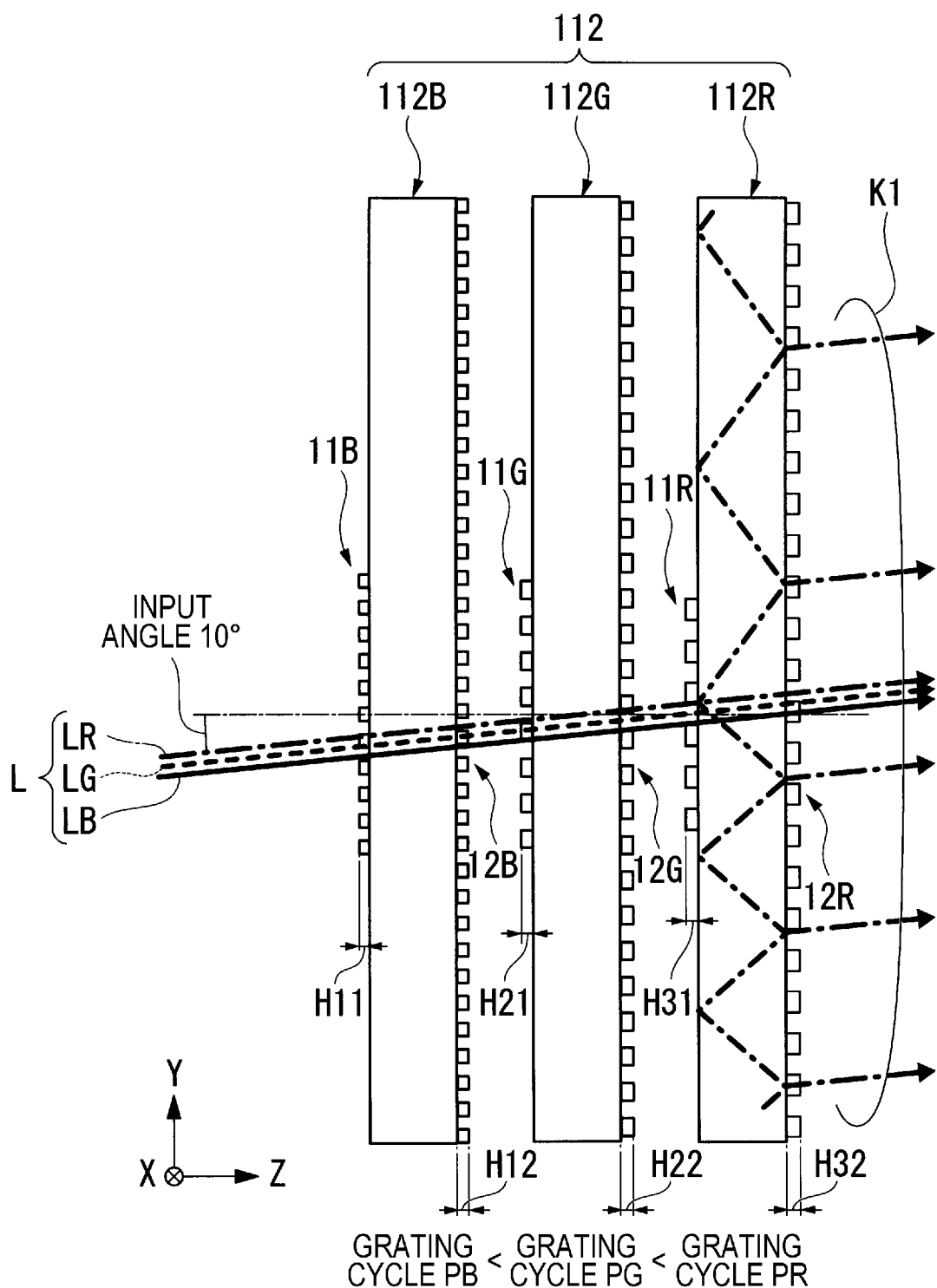
FIG. 11 is a diagram which illustrates a sectional configuration of the image light expanding unit according to the second embodiment.

FIGS. 9 to 11 are sectional views which illustrate a configuration of an image light expanding element according to the embodiment. FIGS. 9 to 11 illustrate sections which are parallel to a YZ plane, and explain propagation of light in the Y direction; however, it is assumed that propagation of light also occurs in the X direction, similarly. That is, light expanded by the image light expanding element is two-dimensionally expanded in the X direction and the Y direction.

FIG. 9 is an explanatory diagram of a diffraction function in an image light expanding element for blue color 112B, FIG. 10 is an explanatory diagram of a diffraction function in an image light expanding element for green color 112G, and FIG. 11 is an explanatory diagram of a diffraction function in an image light expanding element for red color 112R.

As illustrated in FIGS. 9 to 11, an image light expanding element 112 in the embodiment includes the image light expanding element for blue color (first image light expanding element) 112B, the image light expanding element for green color (second image light expanding element) 112G, and the image light expanding element for red color (third image light expanding element) 112R.

Since a basic configuration of the image light expanding element for blue color 112B, the image light expanding element for green color 112G, and the image light expanding element for red color 112R is the same as that of the image light expanding element 12A in the above described embodiment, common portions are given the same reference numerals, and descriptions thereof will be omitted.

According to the embodiment, in the image light expanding element 112, the image light expanding element for blue color 112B, the image light expanding element for green color 112G, and the image light expanding element for red color 112R (hereinafter, these are collectively referred to as expanding elements 112B, 112G, and 112R, simply) are disposed in order along a proceeding direction of the light L, from an input side toward an output side of image light. That is, each of the expanding elements 112B, 112G, and 112R is disposed in order from an expanding element of which a wavelength of corresponding light is short. In addition, the expanding elements 112B, 112G, and 112R are configured of the light guiding plate 1 with the same thickness.

According to the embodiment, image light (light L) which is output from the light source unit 15 of the image light generation unit 19 includes blue light (light in first wavelength band) LB, green light (light in second wavelength band) LG, and red light (light in third wavelength band) LR. These blue light LB, green light LG, and red light LR are input to the image light expanding element 112 at the same input angle (range of ±10°).

According to the embodiment, the image light expanding element for blue color 112B includes a light guiding plate 1B, a diffraction grating on the input side 11B and a diffraction grating on the output side 12B, and corresponds to the blue light LB with a wavelength of 0.460 μm.

The image light expanding element for green color 112G includes a light guiding plate 1G, a diffraction grating on the input side 11G and a diffraction grating on the output side 12G, and corresponds to the green light LG with a wavelength of 0.525 μm.

The image light expanding element for red color 112R includes a light guiding plate 1R, a diffraction grating on the input side 11R and a diffraction grating on the output side 12R, and corresponds to the red light LR with a wavelength of 0.610 μm.

According to the embodiment, grating periods PB, PG, and PR of the image light expanding element for blue color 112B, the image light expanding element for green color 112G, and the image light expanding element for red color 112R satisfy the following relationship. That is, the grating periods PB, PG, and PR become large while being separated from the image light generation unit 19.

$PB < PG < PR$

In addition, a height of grating H11 of the diffraction grating on the input side 11B, a height of grating H12 of the diffraction grating on the output side 12B, a height of grating H21 of the diffraction grating on the input side 11G, a height of grating H22 of the diffraction grating on the output side 12G, a height of grating H31 of the diffraction grating on the input side 11R, and a height of grating H32 of the diffraction grating on the output side 12R satisfy the following relationship.

$H11 < H21 < H31$ $H12 < H11$ $H22 < H21$ $H32 < H31$ $H12 < H11 < H22 < H21 < H32 < H31$

First, the image light expanding element for blue color 112B will be described.

As illustrated in FIG. 9, the image light expanding element for blue color 112B causes both of the +1-st order diffracted light and the −1-st order diffracted light with respect to the blue light LB to be diffracted at an angle larger than a critical angle of the light guiding plate 1B (refractive index 1.52), and a grating period P of a diffraction grating is determined so that diffracted light is propagated inside the light guiding plate 1B. Specifically, according to the embodiment, a grating periods PB (grating period Px and grating period Py) in the diffraction grating on the input side 11B and the diffraction grating on the output side 12B are set to 0.392 μm.

Here, as a comparison example, a case in which the expanding elements 112R, 112G, and 112B are disposed in this order (order in which grating period becomes small) from the input side toward the output side of image light will be described. In this case, since a grating period of the expanding element 112R becomes the largest period, for example, when the blue light LB is input, a diffraction angle thereof becomes small, a lot of unnecessary components of diffracted light are generated by being input to the expanding elements 112G and 112B which are disposed in a rear stage, and light with a component which is output at an angle different from an input angle increases.

In contrast to this, as described above, according to the embodiment, the expanding elements 112B, 112G, and 112R are disposed in this order (order in which grating period becomes large) from the input side toward the output side of image light. The green light LG and the red light LR are also input to the image light expanding element for blue color 112B; however, since a wavelength of the green light LG and the red light LR is larger than that of the blue light LB, the green light LG and the red light LR are diffracted at an angle larger than that of the blue light LB. Accordingly, since inputting of light with an angle different from a predetermined input angle to the image light expanding element for green color 112G or the image light expanding element for red color 112R which are disposed in the rear stage of the image light expanding element for blue color 112B is suppressed, it is possible to suppress a generation of unnecessary diffracted light.

In addition, the height H11 of the diffraction grating on the input side 11B is set to a height in which primary diffraction efficiency is high with respect to the blue light LB with a wavelength of 0.460 μm, and diffraction efficiency with respect to the green light LG and the red light LR is low.

Specifically, the height H11 of the diffraction grating on the input side 11B becomes 0.57 μm, in a case in which a refractive index of the diffraction grating on the input side 11B is 1.65. Meanwhile, the height H12 of the diffraction grating on the output side 12B becomes lower than 0.57 μm. In this manner, it is possible to optimize distribution of light intensity which is output from the diffraction grating on the output side 12B.

In the image light expanding element for blue color 112B, since grating periods of the diffraction grating on the input side 11B and the diffraction grating on the output side 12B are equal, a light beam which is propagated inside the light guiding plate 1 using total reflection, and reaches the diffraction grating on the output side 12B is output at an angle which is the same as the input angle. Accordingly, similarly to the image light expanding element 12A in the first embodiment, the image light expanding element for blue color 112B generates a plurality of blue light beams LB2 which are output at the same angle as the input angle. That is, the image light expanding element for blue color generates an expanded light flux which is obtained by duplicating light output at the same angle as the input angle.

The plurality of blue light beams LB2 are diffracted when being input to the image light expanding element for green color 112G and the image light expanding element for red color 112R, and generates unnecessary diffracted light. When a diffraction angle of the unnecessary diffracted light is sufficiently larger than 10°, the unnecessary diffracted light can be shielded or absorbed in a rear stage.

Since heights of grating of the image light expanding element for green color 112G or the image light expanding element for red color 112R are set so that diffraction efficiency with respect to the green light LG or the red light LR are high, diffraction efficiency with respect to the blue light LB2 is low, and an occurrence of the above described unnecessary diffracted light is substantially suppressed.

Subsequently, the image light expanding element for green color 112G will be described.

As illustrated in FIG. 10, in the image light expanding element for green color 112G, both of the +1-st order diffracted light and the −1-st order diffracted light with respect to the green light LG are diffracted at an angle larger than a critical angle of the light guiding plate 1G (refractive index 1.52), and grating periods of diffraction gratings are determined so that diffracted light is propagated inside the light guiding plate 1G.

Specifically, according to the embodiment, the grating periods PG (grating period Px and grating period Py) in the diffraction grating on the input side 11G and the diffraction grating on the output side 12G are set to 0.447 μm.

Since a wavelength of the red light LR which is input to the image light expanding element for green color 112G is larger than the green light LG, the red light LR is diffracted at an angle larger than that of the green light LG. For this reason, it is possible to suppress an occurrence of unnecessary diffracted light in the image light expanding element for red color 112R which is disposed in the rear stage of the image light expanding element for green color 112G.

The height H21 of the diffraction grating on the input side 11G is set to a height in which the primary diffraction efficiency is high with respect to the green light LG with a wavelength of 0.525 μm, and diffraction efficiency with respect to the blue light LB and the red light LR is low.

Specifically, the height H21 of the diffraction grating on the input side 11G is set to 0.60 μm in a case in which a refractive index of the diffraction grating on the input side 11G is 1.65. Meanwhile, the height d2 of the diffraction grating on the output side 12G becomes lower than 0.60 μm. In this manner, it is possible to optimize distribution of light intensity output from the diffraction grating on the output side 12G.

In the image light expanding element for green color 112G, the grating periods P of the diffraction grating on the input side 11G and the diffraction grating on the output side 12G are equal. For this reason, a light beam which is propagated inside the light guiding plate 1G using total reflection, and reaches the diffraction grating on the output side 12G is output at the same angle as an input angle.

Accordingly, the image light expanding element for green color 112G duplicates a plurality of green light beams LG2 which are output at the same angle as the input angle. That is, an expanded light flux which is obtained by duplicating light output at the same angle as the input angle is generated.

The plurality of green light beams LG2 are diffracted when being input to the image light expanding element for red color 112R, and generates unnecessary diffracted light. When a diffraction angle of the unnecessary diffracted light is sufficiently larger than 10°, the unnecessary diffracted light can be shielded or absorbed in the rear stage.

Since a height of grating of the image light expanding element for red color 112R is set so that diffraction efficiency with respect to the red light LR becomes high, diffraction efficiency with respect to the green light LG2 is low, and an occurrence of the above described unnecessary diffracted light is substantially suppressed.

Subsequently, the image light expanding element for red color 112R will be described.

As illustrated in FIG. 11, in the image light expanding element for red color 112R, both of the +1-st order diffracted light and the −1-st order diffracted light with respect to the red light LR are diffracted at an angle larger than a critical angle of the light guiding plate 1R (refractive index 1.52), and a grating period of the diffraction grating is determined so that diffracted light is propagated in the Y direction in the light guiding plate 1R.

Specifically, according to the embodiment, grating periods PR (grating period Px and grating period Py) in the diffraction grating on the input side 11R and the diffraction grating on the output side 12R are set to 0.520 μm.

The height H31 of the diffraction grating on the input side 11R is set to a height in which primary diffraction efficiency with respect to the red light LR with a wavelength of 0.610 μm becomes high, and diffraction efficiency with respect to the blue light LB and the green light LG becomes low. Specifically, the height H31 of the diffraction grating on the input side 11R becomes 0.70 μm in a case in which a refractive index of the diffraction grating on the input side 11R is 1.65. Meanwhile, the height H32 of the diffraction grating on the output side 12R becomes lower than 0.70 μm. Due to this, it is possible to optimize distribution of light intensity output from the diffraction grating on the output side 12R.

In the image light expanding element for red color 112R, since the grating periods of the diffraction grating on the input side 11R and the diffraction grating on the output side 12R are equal, a light beam which is propagated inside the light guiding plate 1R using total reflection, and reaches the diffraction grating on the output side 12R is output at the same angle as the input angle.

Accordingly, the image light expanding element for red color 112R duplicates a plurality of red light beams LR2 which are output at the same angle as the input angle.

According to the embodiment, it is possible to set diffraction angles in each of the expanding elements 112B, 112G, and 112R to be the same, by setting grating periods of the expanding elements 112B, 112G, and 112R to be different in each color, as described above.

According to the embodiment, since thicknesses of the expanding elements 112B, 112G, and 112R (light guiding plates 1B, 1G, and 1R) are the same, output positions of output light of each color (blue light LB2, green light LG2, and red light LR2) become the same as each other.

Specifically, in a case in which the thicknesses of the light guiding plates 1B, 1G, and 1R which configure the expanding elements 112B, 112G, and 112R are set to 0.8 mm, an expanded light flux K1 with a light flux diameter of 10 mm is generated, when transmitting the expanding elements 112B, 112G, and 112R. In the expanded light flux K1, intervals of output light of each color (blue light LB2, green light LG2, and red light LR2) are set to approximately 2 mm, similarly to that in the first embodiment.

Here, as a comparison example of the configuration of the embodiment, a configuration in which grating periods of the expanding elements 112B, 112G, and 112R are set to be the same, and output positions of each color light are set to be the same, by setting the thicknesses of the light guiding plates 1B, 1G, and 1R to be different is also taken into consideration. Specifically, the thicknesses of the light guiding plates 1B, 1G, and 1R of which diffraction angles are small are set to be large.

However, in this case, since the grating period is the same in each color light, diffraction efficiency also becomes different, since the diffraction angle is different in each color light. In particular, diffraction efficiency of the red light LR of which a diffraction angle becomes large decreases, and it is not easy to adjust a color balance of each color light.

In contrast to this, according to the configuration of the embodiment, since the grating period is determined so that a diffraction angle is set to be the same in each color light, diffraction efficiency of each color light also becomes the same, respectively, it is possible to obtain an effect that it is easy to keep a color balance.

Since it is possible to make the diffraction grating using the same process, because the thicknesses of the light guiding plates 1B, 1G, and 1R are the same, it is possible to obtain an effect of suppressing a manufacturing cost of each of the expanding elements 112B, 112G, and 112R.

As described above, according to the image light expanding element 112 in the embodiment, it is possible to cause image light (expanded light flux K1) in which output light beams of each color (blue light LB2, green light LG2, and red light LR2) are disposed at intervals of approximately 2 mm which is smaller than a size of pupil to be input to the eye ME of an observer M. Accordingly, it is possible to cause the eye ME to visually recognize image light of three colors, even in a case in which the eye ME of the observer M is moved. In addition, since output positions of each color light are the same, turbulence in color balance of image light which is visually recognize by the observer M is suppressed, even in a case in which the eye ME of the observer M is moved.

Therefore, according to the HMD in the embodiment which is provided with the image light expanding element 112, it is possible to provide an image display device which is excellent in visibility of a color image, and has high reliability.

A technical range of the embodiment is not limited to the above described embodiments, and it is possible to add various changes in a range not departing from the scope of the embodiment.

In the above described embodiments, the case in which an input angle of the light L is set to ±10° is exemplified; however, a range of the input angle of the light L is not limited to ±10°.

For example, the light L may be input as an input angle with an angle of ±10° or more. In this case, the grating period P, and the thickness of the light guiding plate 1 in a range of 0.2 mm to 0.8 mm may be appropriately set so that conditions for total reflection in the light guiding plate 1 are satisfied.

The entire disclosure of Japanese Patent Application No. 2016-036787, filed Feb. 29, 2016 is expressly incorporated by reference herein.

What is claimed is:

1. A light flux diameter expanding element comprising:
a first light guiding plate with a thickness of 0.2 mm to 0.8 mm;
a first input diffraction grating provided on the first light guiding plate; and
a first output diffraction grating provided on the first light guiding plate, and provided so as to have an identical grating period as that of the first input diffraction grating, wherein
the first input diffraction grating is smaller than the first output diffraction grating,
the first input diffraction grating diffracts a light into a first diffracted light and a second diffracted light, the first diffracted light is propagated along a first direction, the second diffracted light is propagated along a second direction that is different from the first direction,
the first output diffraction grating diffracts both the first diffracted light and the second diffracted light,
a diffraction angle of the first diffracted light that is diffracted by the first input diffraction grating is larger than a critical angle of the first light guiding plate, and
a diffraction angle of the second diffracted light that is diffracted by the first input diffraction grating is larger than the critical angle of the first light guiding plate.

2. The light flux diameter expanding element according to claim 1, wherein a total thickness of the first light guiding plate and the first input diffraction grating is equal to or lower than 0.825 mm.

3. The light flux diameter expanding element according to claim 1, wherein a total thickness of the first light guiding plate, the first input diffraction grating and the first output diffraction grating is lower than 0.850 mm.

4. The light flux diameter expanding element according to claim 1, wherein a diffraction efficiency of the first output diffraction grating is lower than a diffraction efficiency of the first input diffraction grating.

5. The light flux diameter expanding element according to claim 1, wherein a height of a grating of the first output diffraction grating is lower than a height of a grating of the first input diffraction grating.

6. The light flux diameter expanding element according to claim 1, wherein
the light guiding plate includes a first surface and a second surface that is on an opposite side of the first surface,
the first diffraction light is propagated toward the first surface, and
the second diffraction light is propagated toward the second surface.

7. The light flux diameter expanding element according to claim 1, wherein a distance from the first input diffraction grating to an end of the first output diffraction grating is a half of an entire of the first output diffraction grating.

8. The light flux diameter expanding element according to claim 1, wherein an interval of an output light which diffracted by the first output diffraction grating is 2 mm or less.

9. The light flux diameter expanding element according to claim 1, further comprising:
a second light guiding plate with a thickness of 0.2 mm to 0.8 mm provided over the first light guiding plate;
a second input diffraction grating provided on the second light guiding plate; and a second output diffraction grating provided on the second light guiding plate, wherein
the second input diffraction grating diffracts the light which passed through the first input diffraction grating, and
a grating period of the second input diffraction grating is different from a grating period of the first input diffraction grating.

10. An image display device comprising:
an image light generation unit which outputs an image light; and
an image light expanding element which is configured of the light flux diameter expanding element according to claim 1.

11. The image display device according to claim 10, wherein the image light includes light with different wavelength bands.

12. A light flux diameter expanding element comprising:
a first light guiding plate with a thickness of 0.2 mm to 0.8 mm;
a first input diffraction grating provided on the first light guiding plate; and
a first output diffraction grating provided on the first light guiding plate, and provided so as to have an identical grating period as that of the first input diffraction grating, wherein
the first input diffraction grating is smaller than the first output diffraction grating,
the first input diffraction grating diffracts a light into a first diffracted light and a second diffracted light, the first diffracted light is propagated toward a first direction,
the second diffracted light is propagated toward a second direction that is different from the first direction,
the first output diffraction grating diffracts both the first diffracted light and the second diffracted light,
a diffraction angle of the first diffracted light that is diffracted by the first input diffraction grating is smaller than a diffraction angle of the second diffracted light that is diffracted by the first input diffraction grating, and
the diffraction angle of the first diffracted light is larger than a critical angle of the first light guiding plate.

* * * * *